US011519315B1

(12) United States Patent
Sakuja et al.

(10) Patent No.: US 11,519,315 B1
(45) Date of Patent: Dec. 6, 2022

(54) AFTERTREATMENT SYSTEM, DUAL FUEL SYSTEM, AND DUAL FUEL APPARATUS

(71) Applicant: Cummins Power Generation Inc., Minneapolis, MN (US)

(72) Inventors: Ankit Sakuja, Charleston, SC (US); Srinivas Chakravarthy Bathula, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 17/538,505

(22) Filed: Nov. 30, 2021

(51) Int. Cl.
*F01N 3/20* (2006.01)
*F02M 21/02* (2006.01)
*B01D 53/94* (2006.01)

(52) U.S. Cl.
CPC ........... *F01N 3/208* (2013.01); *B01D 53/944* (2013.01); *B01D 53/9418* (2013.01); *B01D 53/9436* (2013.01); *B01D 53/9477* (2013.01); *B01D 53/9495* (2013.01); *F02M 21/0209* (2013.01); *B01D 2255/20723* (2013.01); *F01N 2610/02* (2013.01); *F01N 2900/1404* (2013.01)

(58) Field of Classification Search
CPC combination set(s) only.
See application file for complete search history.

(56) References Cited

U.S. PATENT DOCUMENTS 5,367,875 A * 11/1994 Aboujaoude ......... F01N 13/009
123/526
5,524,432 A * 6/1996 Hansel ............... B01D 53/9409
60/276

7,210,288 B2  5/2007  Bandl-Konrad et al.
7,490,464 B2  2/2009  Li et al.
8,161,730 B2  4/2012  Chi et al.
(Continued)

FOREIGN PATENT DOCUMENTS

| WO | WO-2007/010664 | 1/2007 |
| WO | WO-2012/150468 A1 | 11/2012 |
| WO | WO-2017/055299 | 4/2017 |

OTHER PUBLICATIONS

US 10,087,810 B2, 10/2018, Khaled (withdrawn)
(Continued)

*Primary Examiner* — Binh Q Tran
(74) *Attorney, Agent, or Firm* — Foley & Lardner LLP

(57) ABSTRACT

Systems and apparatuses include a selective catalytic reduction system structured to receive exhaust gases from a dual fuel engine system and include a diesel exhaust fluid dosing unit, an ammonia slip catalyst positioned directly downstream of the selective catalytic reduction catalyst, an oxidation catalyst positioned directly downstream of the ammonia slip catalyst, and one or more processing circuits. The circuits receive a system out NOx value, a space velocity, an ammonia to NOx ratio, an exhaust temperature, a substitution rate, and a conversion efficiency target. The circuits determine a conversion efficiency differential, adjust the substitution rate based on the system out NOx value, adjust the ammonia to NOx ratio based on the space velocity, the ammonia to NOx ratio, the exhaust temperature, the substitution rate, the conversion efficiency target, and the conversion efficiency differential, and determine a diesel exhaust fluid dosing rate for the diesel exhaust fluid dosing unit.

20 Claims, 9 Drawing Sheets

(56) References Cited

U.S. PATENT DOCUMENTS

| | | | |
|---|---|---|---|
| 8,230,677 B2 | 7/2012 | Devarakonda et al. | |
| 8,407,987 B2 | 4/2013 | Andersson et al. | |
| 8,468,806 B2 | 6/2013 | Andersson et al. | |
| 8,596,045 B2 | 12/2013 | Tuomivaara et al. | |
| 8,640,443 B2 | 2/2014 | Andersson et al. | |
| 8,656,702 B2 | 2/2014 | Alm et al. | |
| 8,682,512 B2 | 3/2014 | Norton | |
| 8,875,490 B2 | 11/2014 | Geveci et al. | |
| 8,997,465 B2 | 4/2015 | Gekas et al. | |
| 9,038,373 B2 | 5/2015 | Geveci et al. | |
| 9,309,819 B2 | 4/2016 | Norton | |
| 9,476,338 B2 | 10/2016 | Geveci et al. | |
| 9,765,674 B2 | 9/2017 | Khaled | |
| 9,890,678 B2 | 2/2018 | Qi | |
| 10,125,660 B2 | 11/2018 | Khaled | |
| 10,287,943 B1 | 5/2019 | Schiltz | |
| 10,364,725 B2 | 7/2019 | Liu et al. | |
| 10,364,731 B2 | 7/2019 | Khaled | |
| 10,392,991 B2 | 8/2019 | Geveci et al. | |
| 10,557,397 B2 | 2/2020 | Khaled | |
| 10,577,994 B2 | 3/2020 | Mittal et al. | |
| 10,787,946 B2 | 9/2020 | Rohde et al. | |
| 2016/0333761 A1* | 11/2016 | Liu | F02D 41/027 |
| 2017/0356322 A1* | 12/2017 | Farid | F01N 11/007 |
| 2018/0135541 A1* | 5/2018 | Hsieh | F02D 41/1446 |
| 2018/0202341 A1 | 7/2018 | Piper et al. | |
| 2019/0345858 A1 | 11/2019 | Zielinski et al. | |
| 2020/0025054 A1* | 1/2020 | Barve | B01D 37/046 |
| 2020/0116063 A1 | 4/2020 | Bleckmann et al. | |
| 2020/0300190 A1* | 9/2020 | Diwakar Abraham | F01N 3/023 |

OTHER PUBLICATIONS

Non-Final Office Action in U.S. Appl. No. 17/538,470 dated Jun. 7, 2022, 12 pages.

Final Office Action on U.S. Appl. No. 17/538,470 dated Oct. 3, 2022, 9 pages.

* cited by examiner

AFTERTREATMENT SYSTEM, DUAL FUEL SYSTEM, AND DUAL FUEL APPARATUS

TECHNICAL FIELD

The present disclosure relates to dual fuel engine systems. More particularly, the present disclosure relates to systems and methods for aftertreatment of exhaust gases produced by a dual fuel engine system.

BACKGROUND

Dual fuel engine systems may include spark ignited or compression ignited engines and burn a combination of two different fuels. For example, a compression engine system may use a combination of natural gas and diesel fuel.

SUMMARY

One embodiment relates to an aftertreatment system that includes a selective catalytic reduction system structured to receive exhaust gases from a dual fuel engine system and including a diesel exhaust fluid dosing unit, an ammonia slip catalyst positioned directly downstream of the selective catalytic reduction catalyst, an oxidation catalyst positioned directly downstream of the ammonia slip catalyst, and one or more processing circuits comprising one or more memory devices coupled to one or more processors, the one or more memory devices configured to store instructions thereon that, when executed by the one or more processors, cause the one or more processors to: receive a system out NOx value, a space velocity, an ammonia to NOx ratio, an exhaust temperature, a substitution rate, and a conversion efficiency target, determine a conversion efficiency differential, adjust the substitution rate based on the system out NOx value, adjust the ammonia to NOx ratio based on the space velocity, the ammonia to NOx ratio, the exhaust temperature, the substitution rate, the conversion efficiency target, and the conversion efficiency differential, and determine a diesel exhaust fluid dosing rate for the diesel exhaust fluid dosing unit.

In at least one embodiment, the selective catalytic reduction catalyst includes a vanadium substrate.

In at least one embodiment, the selective catalytic reduction catalyst and the ammonia slip catalyst are co-located in a single housing.

In at least one embodiment, the substitution rate, the space velocity, the ammonia to NOx ratio, the exhaust temperature, and the conversion efficiency target are received from three-dimensional tables stored in the one or more memory devices.

In at least one embodiment, the three-dimensional tables stored in the one or more memory devices including the space velocity, the ammonia to NOx ratio, the exhaust temperature, and the conversion efficiency target are associated with a substitution rate.

In at least one embodiment, a target ammonia to NOx ratio is determined after adjusting the ammonia to NOx ratio.

In at least one embodiment, the space velocity, the exhaust temperature, the substitution rate, and the conversion efficiency target are received from a dual fuel engine system.

Another embodiment relates to a dual fuel system that includes a dual fuel engine system including a first fuel source, a second fuel source, and a cylinder structured to combust a first fuel from the first fuel source and a second fuel from the second fuel source simultaneously; an aftertreatment system including a selective catalytic reduction system structured to receive exhaust gases from the cylinder, an ammonia slip catalyst positioned downstream of the selective catalytic reduction system, and an oxidation catalyst positioned downstream of the ammonia slip catalyst; and one or more processing circuits comprising one or more memory devices coupled to one or more processors, the one or more memory devices configured to store instructions thereon that, when executed by the one or more processors, cause the one or more processors to: receive a system out NOx value, a space velocity, an ammonia to NOx ratio, an exhaust temperature, a substitution rate, and a conversion efficiency target, determine a conversion efficiency differential, adjust the substitution rate based on the system out NOx value, adjust the ammonia to NOx ratio based on the space velocity, the ammonia to NOx ratio, the exhaust temperature, the substitution rate, the conversion efficiency target, and the conversion efficiency differential, and determine a diesel exhaust fluid dosing rate for the diesel exhaust fluid dosing unit.

In at least one embodiment, the first fuel is natural gas introduced into an intake air stream, and the second fuel is diesel fuel.

Another embodiment relates to a dual fuel apparatus that includes one or more processing circuits comprising one or more memory devices coupled to one or more processors, the one or more memory devices configured to store instructions thereon that, when executed by the one or more processors, cause the one or more processors to: actuate a first fuel actuator to introduce a first gaseous fuel into an intake air stream, actuate a second fuel actuator to introduce a second liquid fuel into a cylinder, and actuate a diesel exhaust fluid dosing unit to treat exhaust gases received from a dual fuel engine combusting the first fuel and the second fuel with a selective catalytic reduction system based on a space velocity, an ammonia to NOx ratio, an exhaust temperature, a substitution rate, and a conversion efficiency target.

In at least one embodiment, the actuation of the diesel exhaust fluid dosing unit includes adjusting the ammonia to NOx ratio based on a conversion efficiency differential.

In at least one embodiment, the one or more memory devices are further configured to store instructions thereon that, when executed by the one or more processors, cause the one or more processors to adjust the substitution rate.

In at least one embodiment, the actuation of the diesel exhaust fluid dosing unit includes querying three-dimensional tables saved in the one or more memory devices, the three-dimensional tables including the space velocity, the ammonia to NOx ratio, the exhaust temperature, and the conversion efficiency target.

In at least one embodiment, the three-dimensional tables are queried using the substitution rate.

In at least one embodiment, the actuation of the diesel exhaust fluid dosing unit includes feedback based control.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
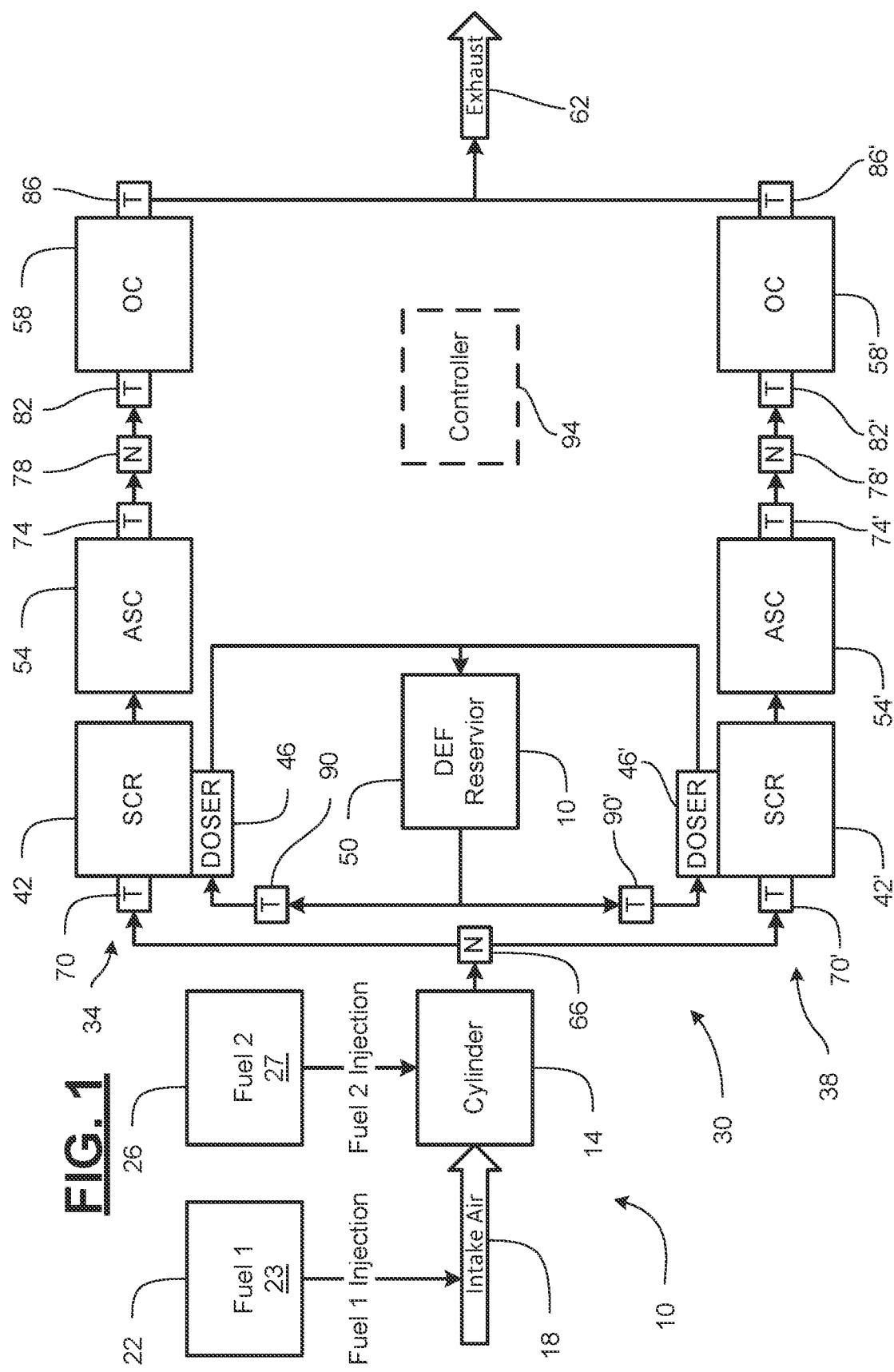
FIG. 1 is a schematic diagram of a dual fuel engine system including an aftertreatment system, according to at least one embodiment.

Following below are more detailed descriptions of various concepts related to, and implementations of, methods, apparatuses, and systems for aftertreatment of exhaust gases produced by a dual fuel engine system. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the figures generally, the various embodiments disclosed herein relate to systems and methods for a dual fuel aftertreatment architecture that includes a vanadium SCR (V-SCR), an ammonia slip catalyst, and an oxidation catalyst (OC). The oxidation catalyst is located downstream of the V-SCR and is designed to take advantage of the dual fuel engine with a V-SCR architecture. The OC can be installed as a retrofit to existing dual fuel engine systems, which are configured to comply with tailpipe Tier-4 emissions standards during a dual fuel operation. In some embodiments, Tier-4 emissions standards can be met for high horse power engine systems (e.g. around 500 hp or over).

In at least one embodiment, a dual fuel operation is achieved on an engine side by utilizing a gas substitution system capable of substituting up to a predetermined amount of diesel fuel (e.g., about 70% diesel fuel) with a gaseous fuel such as natural gas. Dual fuel operation may increase the total hydrocarbons (THC), carbon monoxide (CO) and exhaust temperature at an engine outlet. The combination of a vanadium SCR (V-SCR) and an oxidation catalyst (OC) along with associated controls facilitates compliance with Tier-4 tailpipe emissions requirements during a dual fuel operation. More particularly, the OC oxidizes unburnt hydrocarbons and CO via exothermic reactions, and is installed downstream of the V-SCR.

In at least one embodiment, an exemplary dual fuel engine and aftertreatment system utilizing a combination of the V-SCR and OC, and carrying out associated control thereof, realizes various benefits. In particular, such systems can (i) lower uncontrolled temperature increases across the V-SCR due to higher THC and CO; (ii) lower sublimation risks for a V-SCR substrate; (iii) reduce secondary emissions risks due to partial oxidation of exhaust species across the V-SCR; and/or (iv) reduce the ammonia slip to near zero values across the operating range. Additional benefits can include but are not limited to reduced secondary emissions, alleviation of exothermic concerns for the SCR, effective control of NH3 slip, and/or a lowering of overall cost of ownership for the user. Thus, such embodiments can realize substantial performance gains as compared to systems where an OC is not positioned downstream of a V-SCR with inferior non-methane non-ethane hydrocarbon HC) conversion.

Aftertreatment System

As shown in FIG. 1, a dual fuel system includes a dual fuel engine system including a first fuel source, a second fuel source, and a cylinder structured to combust a first fuel from the first fuel source and a second fuel from the second fuel source simultaneously. The dual fuel system also includes an aftertreatment system including a selective catalytic reduction system structured to receive exhaust gases from the cylinder, an ammonia slip catalyst positioned downstream of the selective catalytic reduction system, and an oxidation catalyst positioned downstream of the ammonia slip catalyst. In some embodiments, the aftertreatment system includes a selective catalytic reduction system structured to receive exhaust gases from a dual fuel engine system and including a diesel exhaust fluid dosing unit; an ammonia slip catalyst positioned directly downstream of the selective catalytic reduction catalyst; an oxidation catalyst positioned directly downstream of the ammonia slip catalyst; and one or more processing circuits comprising one or more memory devices coupled to one or more processors, the one or more memory devices configured to store instructions thereon that, when executed by the one or more processors, cause the one or more processors to: receive a system out NOx value, a space velocity, an ammonia to NOx ratio, an exhaust temperature, a substitution rate, and a conversion efficiency target, determine a conversion efficiency differential, adjust the substitution rate based on the system out NOx value, adjust the ammonia to NOx ratio based on the space velocity, the ammonia to NOx ratio, the exhaust temperature, the substitution rate, the conversion efficiency target, and the conversion efficiency differential, and determine a diesel exhaust fluid dosing rate for the diesel exhaust fluid dosing unit. In some embodiments, the dual fuel system is realized as a dual fuel engine system 10 that includes a combustion cylinder 14 that receives a piston for movement therein. An intake air system 18 provides fresh air to the cylinder 14. A first fuel source 22 includes a first fuel 23, such as a gas, that is injected into the intake air system 18 for combustion within the cylinder 14. In some embodiments, the first fuel source 22 provides natural gas for combustion. For example, the first fuel 23 can be natural gas introduced into the air intake system 18. In some embodiments, a different gaseous fuel is provided by the first fuel source 22 such as synthesis gas, landfill gas, methane, methanol, biogas, etc. The gaseous fuel from the first fuel source 22 can be provided into the intake air system 18 via a metering valve or another suitable system.

In some embodiments, a second fuel source 26 is configured to supply a second fuel 27, such as diesel fuel. Thus, in some embodiments, the second fuel 27 is different than the first fuel 23 which the first fuel source 22 is configured to supply. For example, the first fuel 23 can be air and the second fuel 27 can be liquid (e.g., liquid diesel). The second fuel source 26 is arranged in communication with the cylinder 14 such that the second fuel (e.g., liquid diesel fuel) can be injected into the cylinder 14. In some embodiments, the second fuel is directly injected into the cylinder 14 for combustion together (e.g., simultaneously) with the first gaseous fuel delivered by the intake air system 18. In some embodiments, the second fuel may be injected into the intake air system 14 separately from the first gaseous fuel before the mixture of fresh intake air, the first gaseous fuel, and the second fuel are delivered to the cylinder for combustion. In some embodiments, the second fuel provided by the second fuel source 26 can include other liquid fuels such as biodiesel, bio-oils, petrol, etc. While the following disclosure generally relates to a dual fuel engine system 10 including a first fuel source 22 including natural gas, and a second fuel source 26 including diesel (e.g., the first fuel is natural gas introduced into an intake air stream, and the second fuel is diesel fuel), other combinations of first and second fuels are contemplated. Dual fuel engine systems may include be spark-ignition or compression ignition engines and both types of dual fuel engine systems are contemplated according to various embodiments.

The cylinder 14 defines an exhaust outlet where exhaust gases are expelled from the cylinder 14 and received by an aftertreatment system including a selective catalytic reduction catalyst structured to receive first exhaust gas from the first fuel source of the dual fuel engine system and second exhaust gas from the second fuel source of the dual fuel engine system, an ammonia slip catalyst positioned downstream of the selective catalytic reduction catalyst to receive a flow of exhaust gases from the selective catalytic reduction catalyst without an intervening catalyst, and an oxidation catalyst positioned downstream of the ammonia slip catalyst to receive the flow of exhaust gases from the ammonia slip catalyst without an intervening catalyst. In some embodiments, the first fuel of the first fuel source differs from the second fuel of the second fuel source. In some embodiments, the aftertreatment system can be implemented as an aftertreatment system 30 that includes a first branch 34 and a parallel second branch 38. In some embodiments, the aftertreatment system 30 only includes one branch, or more than two parallel branches. In some embodiments, the components discussed below, including the SCR, are implemented in an aftertreatment system 30 that includes no branches. The intervening catalyst absent in the above-described arrangement for the ammonia slip catalyst can be the same as or differ from the intervening catalyst absent in the above-described arrangement for the oxidation catalyst.

In some embodiments, the first branch 34 includes a selective catalytic reduction (SCR) system 42. The SCR system 42 includes a catalyst and diesel exhaust fluid (DEF) dosing unit (a dose supplier) structured to deliver a diesel exhaust fluid to the selective catalytic reduction catalyst. In particular, the SCR system 42 is configured to treat exhaust gases received from the cylinder, and the treatment includes injecting diesel exhaust fluid. In some embodiments, the SCR system 42 can include a DEF dosing unit 46 in fluid communication with a DEF reservoir 50. The dosing unit is structured to deliver a diesel exhaust fluid to the selective catalytic reduction catalyst. DEF is an aqueous urea solution that functions with the SCR catalyst to reduce nitrogen oxides (NOx) in the exhaust gas flowing through the aftertreatment system 30. The SCR system 42 may also include a supply module (e.g., airless or air-assisted) positioned between the DEF dosing unit 46 to provide a constant and consistent DEF supply to the DEF dosing unit 46. The SCR system 42 may also include DEF heat exchangers, pressure regulators, pressure sensors, temperature sensors, DEF quality sensors, etc. or a combination of the foregoing. A return or bypass line is also provided from the DEF dosing unit 46 back to the DEF reservoir 50.

In some embodiments, the second branch 38 is similar to the first branch 34 and includes similar components. Components of the second branch 38 are labelled with reference numbers with prime symbols. In some embodiments, the second branch 38 includes a second selective catalytic reduction catalyst structured to receive the exhaust gases from the dual fuel engine system in parallel with the selective catalytic reduction catalyst of the first branch 34, a second ammonia slip catalyst positioned downstream of the second selective catalytic reduction catalyst, and a second oxidation catalyst positioned downstream of the second ammonia slip catalyst. In some embodiments, the selective catalytic reduction system includes a first selective catalytic reduction catalyst structured to receive the exhaust gases from the cylinder, and a second selective catalytic reduction catalyst structured to receive the exhaust gases from the cylinder in parallel with the first selective catalytic reduction catalyst. The aftertreatment system further includes a second ammonia slip catalyst positioned downstream of the second selective catalytic reduction catalyst and a second oxidation catalyst positioned downstream of the second ammonia slip catalyst.

In some embodiments, the catalyst included with the SCR system 42 is a vanadium based catalyst (e.g., the selective catalytic reduction catalyst includes a vanadium substrate). Vanadium based catalysts can offer durability and lifespan advantages when used with the dual fuel engine system 10. An ammonia slip catalyst (ASC) 54 is positioned downstream of the SCR system 42 to receive a flow of exhaust gases from the SCR system 42. The ASC 54 may be co-located within a single housing of the SCR system 42 (e.g., the selective catalytic reduction catalyst and the ammonia slip catalyst are co-located in a single housing) or located in a separate housing. The SCR system 42 and the ammonia slip catalyst are arranged so as to treat exhaust gases in a single housing. The ASC 54 performs an ammonia oxidation function that oxidizes ammonia leaving the SCR system 42. The inclusion of the ASC 54 can allow for a higher ammonia to NOx ratio (ANR) during operation while inhibiting ammonia slip or ammonia that exists the aftertreatment system 30 in the flow of exhaust gas. During the ammonia oxidation function, ammonia (NH3) is converted to nitrogen (N2).

In some embodiments, an oxidation catalyst 58 is positioned downstream of the ASC 54 to receive a flow of exhaust gases from the ASC 54. The oxidation catalyst 58 includes an oxidation catalyst that oxidizes CO, hydro carbons (HCs), ammonia (NH3), and other emissions downstream of the ASC 54. The oxidation catalyst 58 may increase a temperature of exhaust gases due to the oxidation activity. In some embodiments, the increase in exhaust gas temperatures can be as high as fifty degrees Celsius (50° C.). In some embodiments, exhaust gases are received from the selective catalytic reduction system with an ammonia slip catalyst before exhaust gases are received by an oxidation catalyst.

According to various embodiments, positioning the oxidation catalyst 58 downstream of the SCR system 42 and the ASC 54 can improve the functionality of the aftertreatment system 30. For example, vanadium based SCR systems 42 may experience NOx performance drops at temperatures greater than four-hundred-seventy-five degrees Celsius (>475° C.). The implementation of the oxidation catalyst 58 downstream of the SCR system 42 can inhibit hydrothermal degradation of the vanadium based catalyst of the SCR system 42. The inhibition of hydrothermal degradation in turn is correlated to a lower deterioration factor. A deterioration factor is a factor expressed as a percent of a design target (e.g., a storage capacity of the catalyst, etc.), and is used to adjust from a zero-hour emissions value to a current emissions value in view of use over an emissions useful life. The zero hour emissions value can be defined as an amount of exhaust emissions measured during a test cycle after the engine has been run-in for a specific amount of time after production testing. The emissions useful life can be defined as a length of time (e.g., as defined in years or miles, and/or defined by regulatory agencies) that a manufacturer demonstrates emission compliance to an emissions standard. Hydrothermal degradation can be among the mechanisms for performance reduction of the aftertreatment system 30 over the emissions useful life. In general, higher temperatures mean a higher likelihood of hydrothermal degradation over the life of the aftertreatment system 30. Positioning the SCR system 42 upstream of the oxygen catalyst 58 can reduce the chances of the SCR system 42 operating at higher exhaust temperatures compared to systems that position an oxygen catalyst upstream of an SCR system.

Additionally, the vanadium substrate of the SCR catalyst may experience a sublimation risk if exhaust temperatures are higher than five-hundred-fifty degrees Celsius (550° C.) and the inclusion of the oxidation catalyst 58 inhibits the incidence of temperatures higher than five-hundred-fifty degrees Celsius (550° C.) at the SCR system 42. Typical dual fuel engine aftertreatment systems can experience ammonia levels of between about nine and about thirteen parts-per-million (9-13 ppm) of ammonia (NH3). The aftertreatment system 30 is configured to reduce ammonia slip to near or approximately zero parts-per-million (0 ppm) during dual fuel operation of the dual fuel engine system 10. After the oxidation catalyst 58, the exhaust gases exit the aftertreatment system 30 through an exhaust 62.

In some embodiments, a sensor array 64 includes sensors positioned throughout the dual fuel engine system 10 and the aftertreatment system 30. The sensors are configured to collect information regarding the exhaust gases throughout the dual fuel engine system 10 and the aftertreatment system 30. In some embodiments, the sensor array 64 includes an engine out NOx sensor 66, an SCR inlet temperature sensor 70, an SCR outlet temperature sensor 74, an SCR outlet NOx sensor 78, an oxidation catalyst inlet temperature sensor 82, an oxidation catalyst sensor 86, and a DEF temperature sensor 90. Similar to the components of the first branch 34 and the second branch 38, sensors on the second branch 38 are identified by prime symbols.

In some embodiments, a controller 94 is arranged in communication with the sensor array 64 to receive information. The controller 94 is configured to receive information relating to one or more of a substitution rate (i.e., the quantity of the first gaseous fuel and the second liquid fuel), temperatures, NOx levels, and other parameters derived from sensor information including space velocity through the aftertreatment system 30, ANR, conversion efficiency, temperatures, and substitution rate. The controller 94 is configured to control the DEF dosing units 46, 46', and the substitution rate of the dual fuel engine system 10. In some embodiments, the controller 94 controls the dosing units 46, 46' based on a space velocity, an ammonia to NOx ratio, an exhaust temperature, a substitution rate, and a conversion efficiency target.

Aftertreatment System Controller

The components of FIG. 1 are shown in the engine system 10 for use in a generator set, including one or more processing circuits comprising one or more memory devices coupled to one or more processors, the one or more memory devices configured to store instructions thereon that, when executed by the one or more processors, cause the one or more processors to control the dosing unit based on a space velocity, an ammonia to NOx ratio, an exhaust temperature, a substitution rate, and a conversion efficiency target. In some embodiments, the one or more processors are embodied by the controller 94 that is configured to control the dosing unit based on a space velocity, an ammonia to NOx ratio, an exhaust temperature, a substitution rate, and a conversion efficiency target. As such, the controller 94 is configured to cause the injection of diesel exhaust fluid based on the space velocity, the ammonia to NOx ratio, the exhaust temperature, the substitution rate, and the conversion efficiency target. In some embodiments, the controller 94 may be structured as one or more electronic control units (ECU). The controller 94 may be separate from or included with at least one of a transmission control unit, an exhaust aftertreatment control unit, a powertrain control module, an engine control module, etc. The function and structure of the controller 94 is described in greater detail in FIG. 2.

Figure 2:
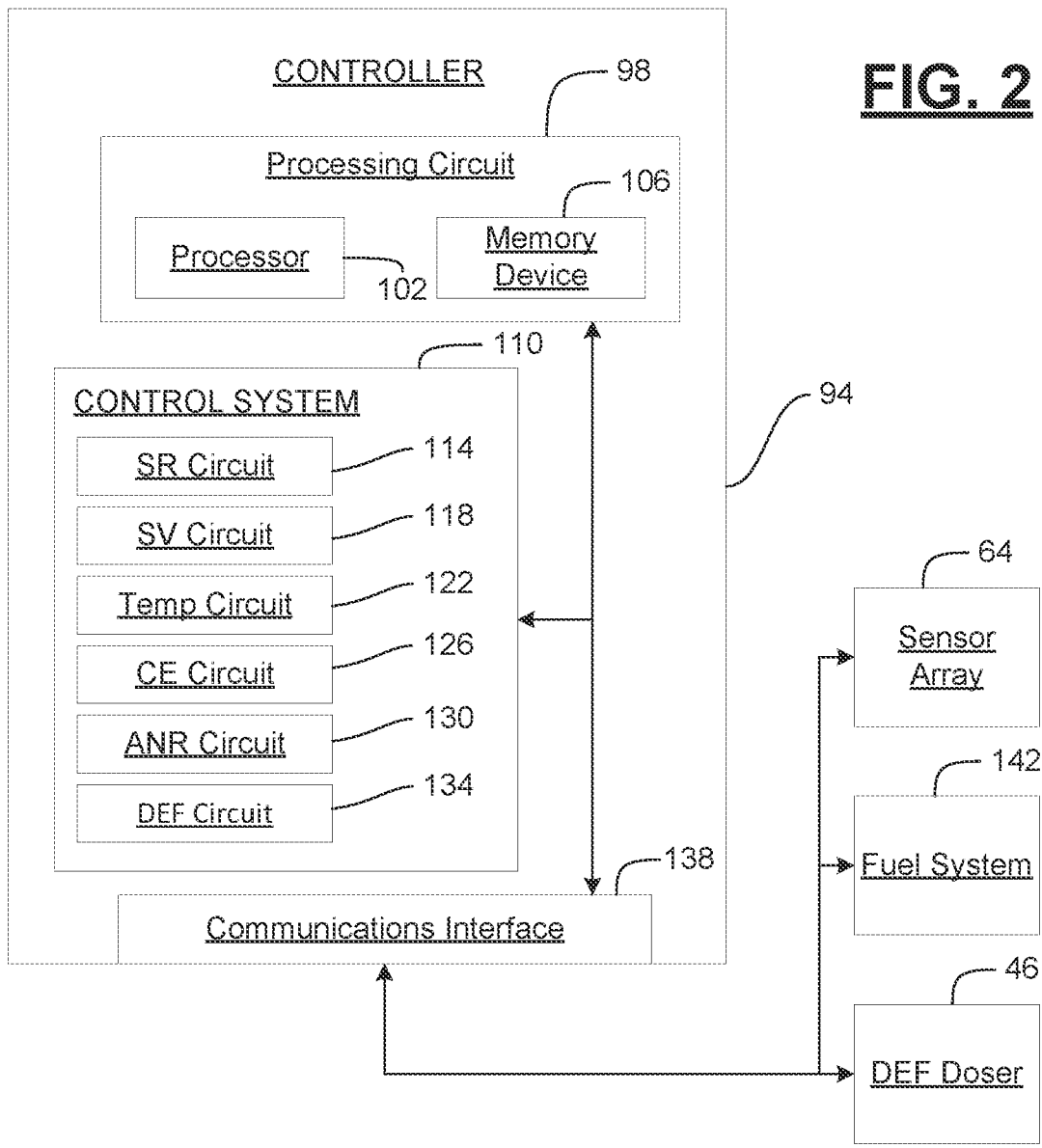
FIG. 2 is a schematic diagram of a controller of the dual fuel engine system of FIG. 1, according to at least one embodiment.

Referring now to FIG. 2, a schematic diagram of the controller 94 of the engine system 10 for use in a generator set of FIG. 1 is shown according to an example embodiment. As shown in FIG. 2, the controller 94 includes a processing circuit 98 having a processor 102 and a memory device 106; a control system 110 having a substitution rate circuit 114, a space velocity circuit 118, a temperature circuit 122, a conversion efficiency circuit 126, an ANR circuit 130, and a DEF dosing circuit 134; and a communications interface 138. Generally, the controller 94 is structured to use several variables (e.g., space velocity, ANR, exhaust temperature, substitution rate, and conversion efficiency target) for determining DEF dosing administered by the DEF dosing units 46, 46' to meet applicable Tier-4 emissions standards. Closed loop dosing control is utilized to optimize for varying feed gas quality, overall fluid consumption, substitution rate and/or compliance.

In some embodiments, one or more of the substitution rate circuit 114, the space velocity circuit 118, the temperature circuit 122, the conversion efficiency circuit 126, the ANR circuit 130, and the DEF dosing circuit 134 are embodied as machine-readable or computer-readable media that are executable by a processor, such as processor 102. As described herein and amongst other uses, the machine-readable media facilitates performance of certain operations to facilitate reception and transmission of data. For example, the machine-readable media may provide an instruction (e.g., command, etc.) to acquire or transmit data, for example. In this regard, the machine-readable media may include programmable logic that defines the frequency of acquisition of the data (or, transmission of the data). The computer readable media is configured to include code, which may be written in any programming language including, but not limited to, Java or the like and any conventional procedural programming languages, such as the "C" programming language or similar programming languages. The computer readable program code is executable on one processor or multiple remote processors. In the latter scenario, the remote processors may be connected to each other through any type of network (e.g., CAN bus, etc.).

In some embodiments, the substitution rate circuit 114, the space velocity circuit 118, the temperature circuit 122, the conversion efficiency circuit 126, the ANR circuit 130, and the DEF dosing circuit 134 are embodied as hardware units, such as electronic control units. As such, the substitution rate circuit 114, the space velocity circuit 118, the temperature circuit 122, the conversion efficiency circuit 126, the ANR circuit 130, and the DEF dosing circuit 134 may be embodied as one or more circuitry components. The circuitry components include, but are not limited to, processing circuitry (e.g., the processing circuit 98), network interfaces, peripheral devices, input devices, output devices, sensors, etc. In some embodiments, the substitution rate circuit 114, the space velocity circuit 118, the temperature circuit 122, the conversion efficiency circuit 126, the ANR circuit 130, and the DEF dosing circuit 134 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the substitution rate circuit 114, the space velocity circuit 118, the temperature circuit 122, the conversion efficiency circuit 126, the ANR circuit 130, and the DEF dosing circuit 134 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

In some embodiments, the substitution rate circuit 114, the space velocity circuit 118, the temperature circuit 122, the conversion efficiency circuit 126, the ANR circuit 130, and the DEF dosing circuit 134 may also include programmable hardware devices such as field programmable gate arrays, programmable array logic, programmable logic devices or the like. The substitution rate circuit 114, the space velocity circuit 118, the temperature circuit 122, the conversion efficiency circuit 126, the ANR circuit 130, and the DEF dosing circuit 134 may include one or more memory devices for storing instructions that are executable by the processor(s) of the substitution rate circuit 114, the space velocity circuit 118, the temperature circuit 122, the conversion efficiency circuit 126, the ANR circuit 130, and the DEF dosing circuit 134. The one or more memory devices and processor(s) may have the same definition as provided below with respect to the memory device 106 and processor 102. In some hardware unit configurations, the substitution rate circuit 114, the space velocity circuit 118, the temperature circuit 122, the conversion efficiency circuit 126, the ANR circuit 130, and the DEF dosing circuit 134 may be geographically dispersed throughout separate locations in the system. Alternatively and as shown, the substitution rate circuit 114, the space velocity circuit 118, the temperature circuit 122, the conversion efficiency circuit 126, the ANR circuit 130, and the DEF dosing circuit 134 may be embodied in or within a single unit/housing, which is shown as the controller 94.

As shown in FIG. 2, the controller 94 includes the processing circuit 98 having the processor 102 and the memory device 106. The processing circuit 98 is structured or configured to execute or implement the instructions, commands, and/or control processes described herein with respect to substitution rate circuit 114, the space velocity circuit 118, the temperature circuit 122, the conversion efficiency circuit 126, the ANR circuit 130, and the DEF dosing circuit 134. The depicted configuration represents the substitution rate circuit 114, the space velocity circuit 118, the temperature circuit 122, the conversion efficiency circuit 126, the ANR circuit 130, and the DEF dosing circuit 134 as machine or computer-readable media. However, as mentioned above, this illustration is not meant to be limiting as the present disclosure contemplates other embodiments where one or more of the substitution rate circuit 114, the space velocity circuit 118, the temperature circuit 122, the conversion efficiency circuit 126, the ANR circuit 130, and the DEF dosing circuit 134, or at least one circuit of the substitution rate circuit 114, the space velocity circuit 118, the temperature circuit 122, the conversion efficiency circuit 126, the ANR circuit 130, and the DEF dosing circuit 134 is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 102) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor, such as processor 102, also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the substitution rate circuit 114, the space velocity circuit 118, the temperature circuit 122, the conversion efficiency circuit 126, the ANR circuit 130, and the DEF dosing circuit 134 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to facilitate independent, parallel, pipelined, or multi-threaded instruction execution. All such variations are intended to fall within the scope of the present disclosure.

The memory device 106 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 106 may be communicably connected to the processor 102 to provide computer code or instructions to the processor 102 for executing at least some of the processes described herein. Moreover, the memory device 106 may be or include tangible, non-transient volatile memory or non-volatile memory. Accordingly, the memory device 106 may include database components, object code components, script components, or any other type of information structure for supporting the various activities and information structures described herein.

The circuitry shown in FIG. 2 is described in more detail below. The substitution rate circuit 114 shown in FIG. 2 is configured to receive a substitution rate from a fuel system 142 (e.g., the first fuel source 22, the second fuel source 26, and fuel actuators) as an input to the controller 94. The substitution rate circuit 114 is further configured to control actuation of the fuel system 142 to control the substitution rate supplied to the cylinder 14.

Referring again to FIG. 2, the space velocity circuit 118 is structured to determine a space velocity of exhaust gases flowing through the aftertreatment system 30. Space velocity is defined by the volumetric flow rate of the exhaust gas to the volume of the aftertreatment system 30.

Further, the temperature circuit 122 shown in FIG. 2 is structured to receive temperature information from the temperature sensors within the sensor array 64. In some embodiments, the temperature circuit 122 generates a temperature model of the aftertreatment system 30 based on the sensor array 64.

The conversion efficiency circuit 126 shown in FIG. 2 is structured to determine a conversion efficiency target of the aftertreatment system 30 and a current conversion efficiency during operation based on sensor information, virtual sensor information, and derived values.

The ANR circuit 130 shown in FIG. 2 is structured to determine a current ammonia to NOx ratio (ANR), determine a target ANR, and control the fuel system 142, the engine system 10, and DEF dosing units 46, 46' to adjust the ANR. In some embodiments, the ANR circuit 130 determines a target ammonia to NOx ratio after adjusting the ammonia to NOx ratio.

The DEF dosing circuit 134 shown in FIG. 2 is structured to adjust the DEF dosing units 46, 46' in response to determinations of the controller 94 based on outputs from the substitution rate circuit 114, the space velocity circuit 118, the temperature circuit 122, the conversion efficiency circuit 126, and the ANR circuit 130.

Method of Operating the Aftertreatment System

Figure 3:
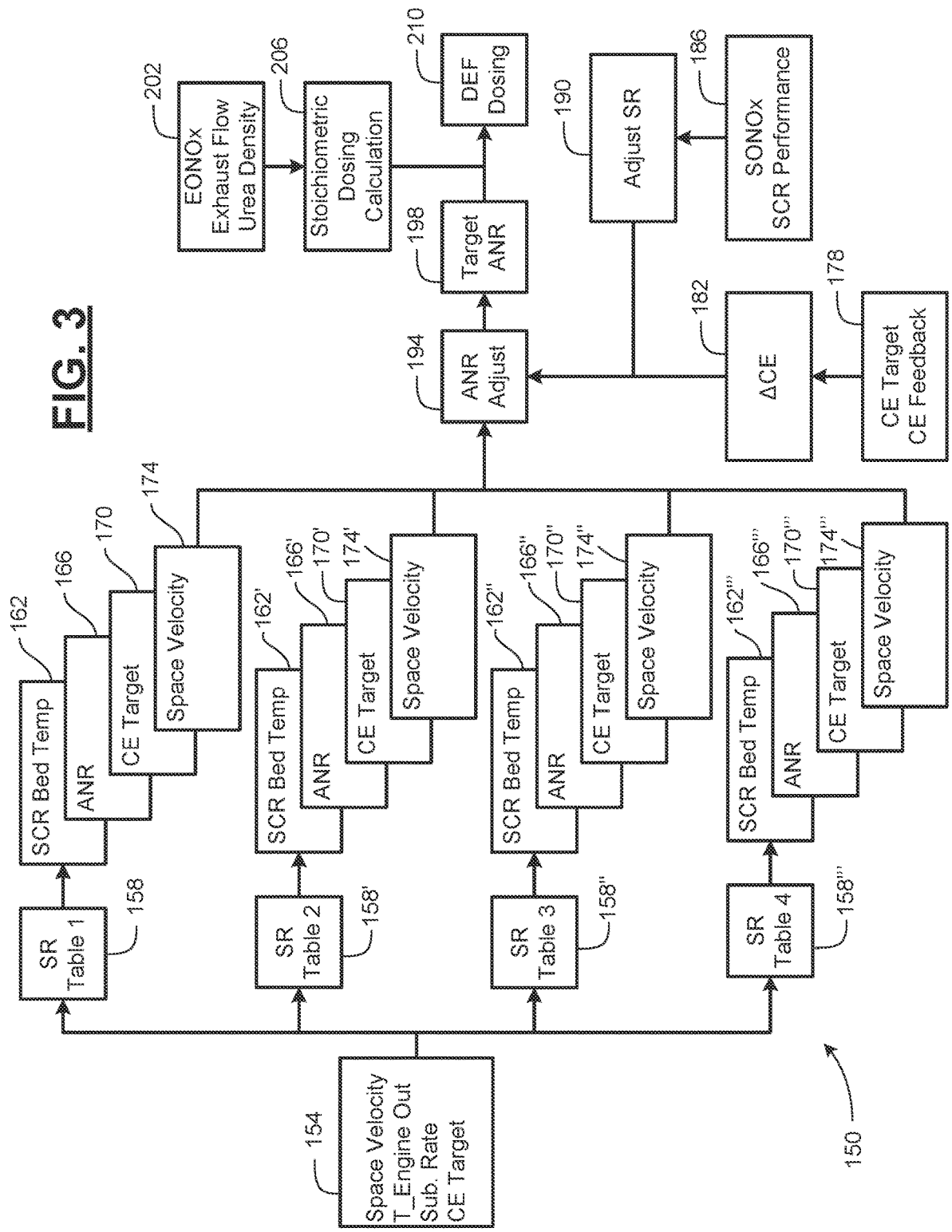
FIG. 3 is a flow chart of a method of operating the dual fuel engine system of FIG. 1, according to at least one embodiment.

A method 150 of operating the dual fuel engine system 10 and the aftertreatment system 30 using the controller 94 is shown in FIG. 3. Aftertreatment methods (e.g., the method 150) include actuating a first fuel actuator to introduce a first gaseous fuel into an intake air stream, actuating a second fuel actuator to introduce a second liquid fuel into a cylinder, combusting the first gaseous fuel and the second liquid fuel within the cylinder, treating exhaust gases received from the cylinder with a selective catalytic reduction system, and treating exhaust gases received from the selective catalytic reduction system with an oxidation catalyst. In some embodiments, a dual fuel system includes a dual fuel engine system including a first fuel source, a second fuel source, and a cylinder structured to combust a first fuel from the first fuel source and a second fuel from the second fuel source simultaneously; an aftertreatment system including a selective catalytic reduction system structured to receive exhaust gases from the cylinder, an ammonia slip catalyst positioned downstream of the selective catalytic reduction system, and an oxidation catalyst positioned downstream of the ammonia slip catalyst; and one or more processing circuits comprising one or more memory devices coupled to one or more processors, the one or more memory devices configured to store instructions thereon that, when executed by the one or more processors, cause the one or more processors to: receive a system out NOx value, a space velocity, an ammonia to NOx ratio, an exhaust temperature, a substitution rate, and a conversion efficiency target, determine a conversion efficiency differential, adjust the substitution rate based on the system out NOx value, adjust the ammonia to NOx ratio based on the space velocity, the ammonia to NOx ratio, the exhaust temperature, the substitution rate, the conversion efficiency target, and the conversion efficiency differential, and determine a diesel exhaust fluid dosing rate for the diesel exhaust fluid dosing unit. In some embodiments, a dual fuel apparatus includes one or more processing circuits comprising one or more memory devices coupled to one or more processors, the one or more memory devices configured to store instructions thereon that, when executed by the one or more processors, cause the one or more processors to: actuate a first fuel actuator to introduce a first gaseous fuel into an intake air stream; actuate a second fuel actuator to introduce a second liquid fuel into a cylinder; and actuate a diesel exhaust fluid dosing unit to treat exhaust gases received from a dual fuel engine combusting the first fuel and the second fuel with a selective catalytic reduction system based on a space velocity, an ammonia to NOx ratio, an exhaust temperature, a substitution rate, and a conversion efficiency target. In some embodiments, the method 150 includes receiving information at step 154. In some embodiments, at step 154, the controller 94 receives a space velocity value from the space velocity circuit 118, an engine out temperature from the temperature circuit 122 (e.g., via the SCR inlet temperature sensors 70, 70'), a substitution rate (e.g., from about 30% to about 70%) from the substitution rate circuit 114, a conversion efficiency target from the conversion efficiency circuit 126, and an initial ANR target from the ANR circuit 130. In some embodiments, the information received at step 154 is received from an engine control unit of the dual fuel engine system 10. For example, the space velocity, the engine out temperature, the substitution rate, and the conversion efficiency target may be current values in use by the engine control unit. The controller 94 is configured to communicate with the aftertreatment system 30. Further, the controller 94 is configured to receive the values from the engine control unit.

At step 158, the substitution rate circuit 114 receives the current substitution rate and references a three-dimensional substitution rate table stored in the memory device 106. The dual fuel engine system 10 is structured to operate with a wide range of substitution rates. Each substitution rate is associated with a substitution rate table. Four substitution rate tables 158, 158', 158", 158''' are shown in FIG. 3, but more than four or fewer than four substitution rate tables are contemplated. The three-dimensional substitution rate tables may include operational parameters (e.g., metering flow rates for the first gaseous fuel, injection rates for the second liquid fuel, etc.) and inputs (e.g., demanded torque, demanded engine rpm, etc.).

The controller 94 receives the substitution rate table from step 158, and references associated three-dimensional tables for SCR bed temperature, ANR, conversion efficiency targets, and space velocity. The temperature circuit 122 queries the memory device 106 using the current substitution rate as an input and receives a three-dimensional SCR bed temperature table 162. The ANR circuit 130 queries the memory device 106 using the current substitution rate as an input and receives a three-dimensional ANR table 166. The conversion efficiency circuit 126 queries the memory device 106 using the current substitution rate as an input and receives a three-dimensional conversion efficiency table 170. The space velocity circuit 118 queries the memory device 106 using the current substitution rate as an input and receives a three-dimensional space velocity table 174. Each of the SCR bed temperature table 162, the ANR table 166, the conversion efficiency table 170, and the space velocity table 174 are associated with a single substitution rate and substitution rated table 158. As shown in FIG. 3, each substitution rate table 158, 158', 158", 158" is associated with a sub-set of tables.

At step 194, the controller 94 adjusts the ANR based on the results returned by the substitution rate table 158, the SCR bed temperature table 162, the ANR table 166, the conversion efficiency table 170, and the space velocity table 174. At step 198, the controller updates a target ANR based on the adjustments made in step 194 and provides the target ANR to the engine system 10 (e.g., the engine control unit) and the DEF system including the DEF dosing units 46, 46'.

Adjustment of the ANR at step 194 and determination of the new ANR target at step 198 are also accomplished in view of a feedback control. The feedback control includes receipt of a target conversion efficiency and a conversion efficiency feedback received at step 178. The target conversion efficiency and the conversion efficiency feedback are current values determined based on sensor information received from the sensor array 64. At step 182, the conversion efficiency circuit 126 determines a difference (ΔCE) between the conversion efficiency feedback (i.e., the current real world conversion efficiency) and the target conversion efficiency (e.g., as returned from the target conversion efficiency table 170). The ΔCE indicates how far the aftertreatment system 30 is operating outside the target conversion efficiency and allows the system to react via feedback and reduce the ΔCE.

At step 186, the controller 94 can receive a system out NOx information (e.g., from a NOx sensor positioned within the exhaust outlet 62, a virtual sensor, or another sensor) and a SCR performance parameter (e.g., experiencing ammonia slip, higher than desired system out NOx, etc.). If the system out NOx information indicates a high value (e.g., above a threshold) or another SCR performance parameter indicates non-optimized performance, the substitution rate may be adjusted at step 190.

In some embodiments, the controller 94 is configured to adjust the ANR at step 194 based on feedback information. Examples of feedback information usable by the controller 94 in adjusting the ANR include feedback generated at step 182 and at step 190 including the ΔCE and the adjusted or updated substitution rate. In some embodiments, one or more processing circuits comprising one or more memory devices coupled to one or more processors are provided. The one or more memory devices are configured to store instructions thereon that, when executed by the one or more processors, cause the one or more processors to send a feedback substitution rate command to the dual fuel engine system 10 based on a system out NOx value. In some embodiments, the controller 94 is structured to send a feedback substitution rate command to the dual fuel engine system based on a system out NOx value. In some embodiments, the adjusted substitution rate from step 190 is also provided to the engine system 10 and the fuel system 142 is operated in view of the updated substitution rate. The updated substitution rate is also provided to the controller 94 at step 154. Thus, the substitution rate table 158 updates and results in the update of the SCR bed temperature table 162, the ANR table 166, the conversion efficiency table 170, and the space velocity table 174. Thus, a feedback loop is created that continually updates the ANR, target, ANR, and substitution rate based on the operation and targets of the dual fuel engine system 10 and the aftertreatment system 30.

The controller 94 also controls operation of the DEF system via the DEF circuit 134. At step 202, the DEF circuit 134 receives an engine out NOx value (e.g., from the engine out NOX sensor 66), an exhaust flow value (e.g., the space velocity from the space velocity table 174), and a urea density (e.g., from DEF quality sensor in the DEF reservoir 50). At step 206, the DEF circuit 134 calculates a dosing value based on the received information. At step 210, the DEF circuit 134 provides the dosing value to the DEF dosing units 46, 46' for operation of the aftertreatment system 30.

Figure 4:
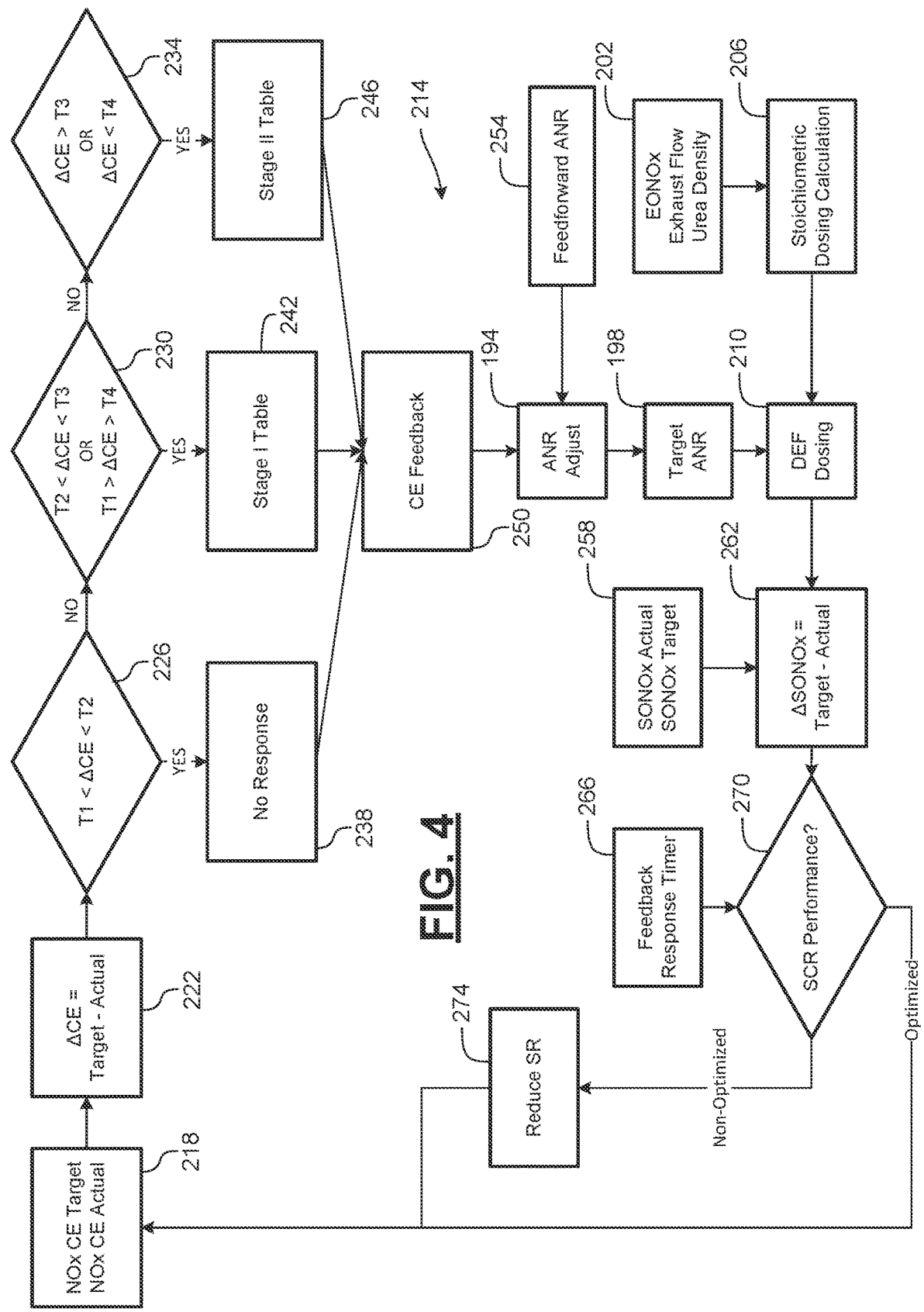
FIG. 4 is a flow chart of a method of operating the dual fuel engine system of FIG. 1, according to at least one embodiment.

Another method 214 of operating the dual fuel engine system 10 and the aftertreatment system 30 using the controller 94 is shown in FIG. 4. The method 214 includes receiving information at step 218 including a target NOx conversion efficiency and an actual NOx conversion efficiency. At step 222, the controller 94 determines a conversion efficiency difference (ΔCE) between the target NOx conversion efficiency and the actual NOx conversion efficiency.

At step 226, the controller 94 determines whether the conversion efficiency difference is within a first hysteresis band. In some embodiments, the first hysteresis band is defined between a first threshold (T1) (e.g., four percent lower than the target NOx conversion efficiency) and a second threshold (T2) (e.g., four percent higher than the target NOx conversion efficiency) defined with respect to the target NOx conversion efficiency. In some embodiments, other thresholds (e.g., absolute values, etc.) are utilized to define the first hysteresis.

At step 230, the controller 94 determines whether the conversion efficiency difference is within a second hysteresis band. In some embodiments, the second hysteresis band is defined between the second threshold (T2) (e.g., four percent higher than the target NOx conversion efficiency) and a third threshold (T3) (e.g., ten percent higher than the target NOx conversion efficiency), or between the first threshold (T1) (e.g., four percent lower than the target NOx conversion efficiency) and a fourth threshold (T4) (e.g., ten percent lower than the target NOx conversion efficiency). In some embodiments, other thresholds are utilized.

At step 234, the controller 94 determines if the conversion efficiency difference is within a third hysteresis band. In some embodiments, the third hysteresis band is defined as a conversion efficiency difference above the third threshold (T3) (e.g., ten percent higher than the target NOx conversion efficiency) or a conversion efficiency difference below the fourth threshold (T4) (e.g., ten percent lower than the target NOx conversion efficiency). In some embodiments, other thresholds are utilized.

In some embodiments, if the conversion efficiency difference is determined to be within the first hysteresis band at step 226, then no response is made at step 238. If the conversion efficiency difference is determined to be within the second hysteresis band at step 230, then the controller 94 performs a query. For example, the controller 94 queries a Stage I table stored in the memory device 106 using the conversion efficiency difference. If the conversion efficiency difference is determined to be within the third hysteresis band at step 234, then the controller 94 queries a Stage II table stored in the memory device 106 using the conversion efficiency difference. The Stage I and the Stage II tables are calibration tables that allow a feedback loop to increase or decrease the ANR if the conversion efficiency difference between the target and the actual crosses certain bands. For example, plus-or-minus a first percent (e.g., four percent) is considered a no response or do nothing band assuming the error is an outcome of system variation (e.g., sensors, catalyst, dosers, pumps etc.). A conversion efficiency difference greater than the first percentage (e.g., four percent) but lower than a second percent (e.g., ten percent) may be considered a first stage ANR correction, and a conversion efficiency difference of greater than the second percentage (e.g., ten percent) may be considered a second stage ANR correction. The values of four percent and ten percent are exemplary and can be different for different programs/ratings.

At step 250, the conversion efficiency feedback received from the steps 238, 242, and 246 is compiled. The ANR is adjusted at step 194. The amount of ANR increase or decrease at step 194 is adjusted based on the hysteresis bands and the amount of ANR increase or decrease is what is provided to the ANR Adjust block at step 194. For example, if the actual NOx conversion efficiency is lower than the target NOx conversion efficiency by more than four percent, a positive ANR correction is provided to the ANR adjust block to increase the ANR target at step 198 thereby increasing dosing at step 210 to bring the actual NOx conversion efficiency closer to the target NOx conversion efficiency. In some embodiments, steps 194, 198, 202, 206, are substantially the same as in the method 150 shown in FIG. 3. Additionally, feedforward ANR information received from step 254 can be the same or similar to the feedforward operations of step 158, 162, 166, 170, 174 of the method 150 shown in FIG. 3. At step 210, the DEF dosing is adjusted based on the received information.

At step 258, the controller 94 receives an actual system out NOx form the sensor array 64 and a system out NOx difference (ΔSONOx) is determined by subtracting the actual system out NOx from a target system out NOx at step 262. At step 266, a timer is used to determine a length of time for which the controller 94 has attempted to correct the conversion efficiency difference. Then, at step 270, the controller 94 determines an SCR performance decision based on the system out NOx difference determined in step 262 and the timer determined at step 266. The SCR performance decision provides an indication of performance. The SCR performance decision provides an indication of optimized performance when the aftertreatment system 30 is operating as desired. The SCR performance decision provides an indication of non-optimized performance when the aftertreatment system 30 is not responding to adjusted ANR and DEF dosing as desired. If the SCR performance decision is determined to be non-optimized at step 270, then the controller 94 prompts a reduction to the substitution rate of the engine system 10 at step 274.

In some embodiments, in the event of the dual fuel engine system 10 and aftertreatment system 30 continuing to operate at higher SONOx than the target, the SCR performance is deemed non-optimized. An example target is a conversion efficiency difference which continues to be outside the plus-or-minus about a first percent (e.g., four percent) no response band. If the SCR performance is deemed non-optimized, the feedback controller 94 signals the engine system 10 to reduce the substitution rate via an iterative process until SONOx targets are met and the SCR performance is deemed improved. The iterative process can reduce the substitution rate in steps of about five percent, for example. Then, the method 214 continues to bring the conversion efficiency difference within a system variation (e.g. plus-or-minus four percent). If the SCR performance continues to be non-optimized, then the iterative process reduces the substitution rate by about another five percent and repeats the iterative process (e.g., the method 214) until the SCR performance is optimized. In some embodiments, the substitution rates are greater than or less than about five percent, as desired.

Existing aftertreatment systems generally relate to either diesel fuel or lean burn gasoline engines. Exemplary techniques herein are directed to dual fuel engines that combust a combination of two different fuels (e.g., a gaseous fuel and a liquid fuel). Some aftertreatment architectures include a NOx storage reduction (NSR) system that primarily stores NOx engine out during lean operation only later to regenerate the stored NOx into N2, NH3 during rich operation. The systems disclosed herein do not include an NSR. The aftertreatment system includes a V-SCR 42 with an ASC 54, and an OC 58 positioned downstream. The disclosed architecture of the systems provide a different layout and functionality than systems utilizing an NSR. The OC 54 by principle causes an exothermic reaction that leads to a positive temperature delta across the OC 54. The temperature delta can reach as high as about 50° C. to about 70° C. during dual fuel operation depending on gas quality. The V-SCR 42 may have a temperature limit of 550° C. Adding an oxidation catalyst upstream could increase the likelihood of damaging the V-SCR 42 due to the positive temperature delta across the upstream oxidation catalyst. The oxidation catalyst disclosed herein is positioned behind or downstream of the V-SCR 42 to mitigate the risk of (1) damaging the V-SCR 42, and (2) excessive aging of the V-SCR 42 leading to lower NOx performance.

Engine operation using a diesel combustion is significantly different than engine operation in dual fuel mode and leads to differences in exhaust gas composition. The total hydrocarbons (THC) and carbon monoxide (CO) at engine out may be 10-15× higher in dual fuel operation when compared to diesel operation. The THC and CO pose a challenge for the aftertreatment system 30 as they could react with the V-SCR 42, ASC 54, OC 58 substrate and DEF introduced by the DEF dosing unit 46. The THC and CO can contribute to secondary emissions (i.e., emissions that are un-regulated but could be harmful). The secondary emissions risk is relatively higher for the V-SCR 42 among the V-SCR 42, ASC 54, and the OC 58. Therefore, having a downstream OC 58 helps to mitigate potential risk of secondary emissions during dual fuel operation.

It may be advantageous for dual fuel operation to manage NOx emissions and NMNEHC emissions using the V-SCR 42 and the OC 58. The ASC 54 has a SCR layer and an OC layer that performs dual function of both SCR and OC. To achieve NOx and NMNEHC performance from the entire aftertreatment system 30, it may be advantageous to control engine out THC emissions and exhaust temperature. Some embodiments include emissions control taking into account one or more of the following considerations. A first consideration is the correlation between higher THC an inhibition of SCR NOx performance. Another such consideration is the relationship between higher exhaust temperatures and inhibition of SCR NOx performance, and a third such consideration is the relationship between low exhaust temperatures and inhibition of OC NMNEHC performance. Limits for both THC and exhaust temperature are defined within the tables and the controls are designed to create a balance between THC and exhaust temperature and extracting the required performance from the SCR, ASC and OC to meet or surpass regulation requirements.

Figure 5:
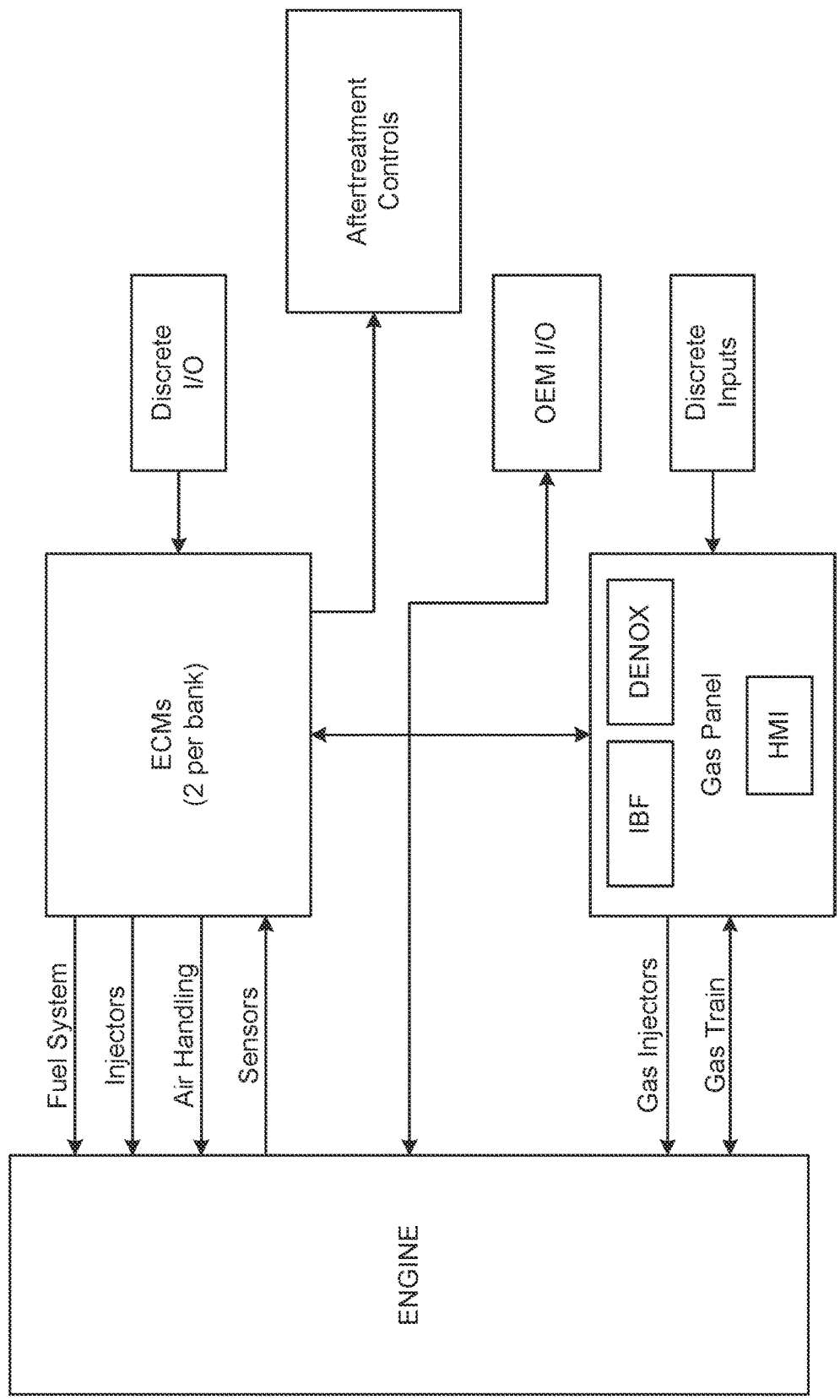
FIG. 5 is a schematic diagram of a control architecture of the dual fuel engine system of FIG. 1, according to at least one embodiment.

As shown in FIG. 5, the dual fuel engine system 10 is configured to be operable under the control of one or more engine control modules (ECMs), a gas control panel, and a controller (e.g., a controller from an original equipment manufacturer). Generally, the ECMs control liquid fuel and intake air and additionally communicate with an aftertreatment system controller. The ECMs can receive discrete inputs (for example a throttle input). The gas panel is structured to implement the substitution rate using gas injectors, and provides inlet barrier filter (IBF) and NOx reduction (DENOX) features as well as a human machine interface for user interaction with the gas panel. The gas panel can also receive discrete inputs. The architecture shown in FIG. 5 is exemplary. Other control architectures are contemplated within the scope of the claims and the disclosure herein.

Figure 6:
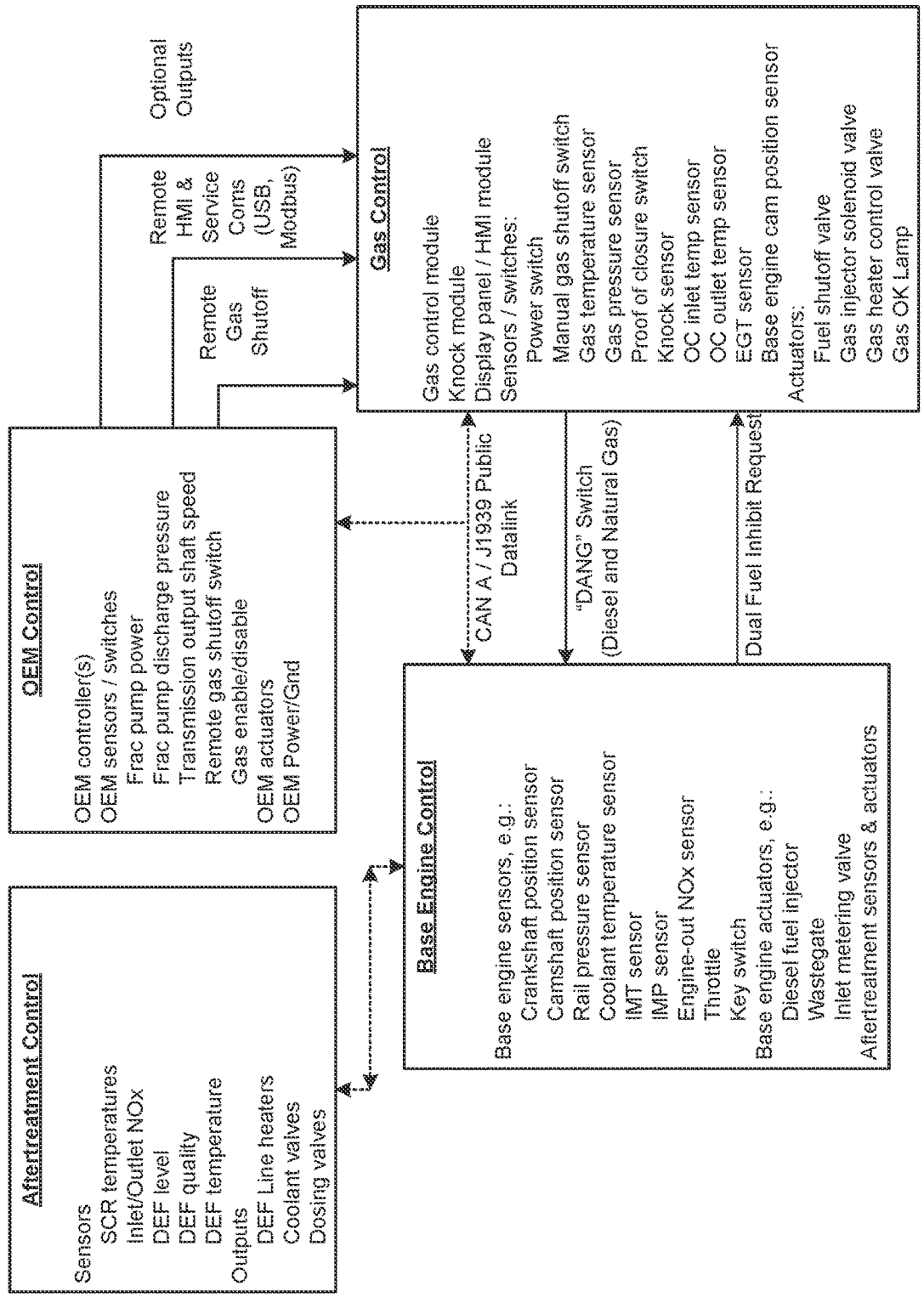
FIG. 6 is a schematic diagram of a control architecture of the dual fuel engine system of FIG. 1, according to at least one embodiment.

FIG. 6 shows a communication scheme for the control architecture of FIG. 5 including exemplary and non-limiting inputs and outputs used to achieve the control and concepts discussed in detail above. Other communication schemes, inputs, outputs, and communication links are contemplated within the scope of the claims and the disclosure.

Figure 7:
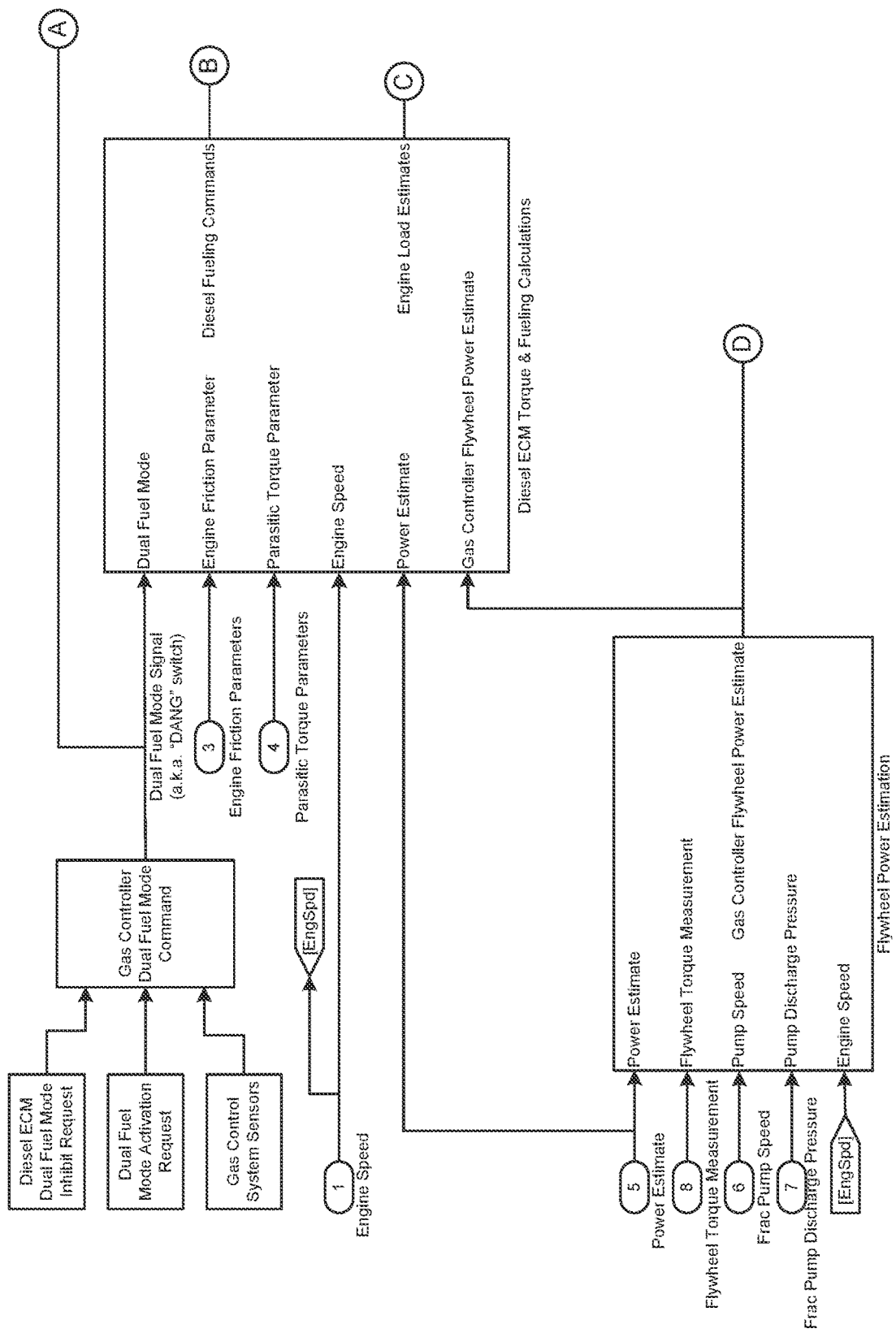
FIGS. 7-9 are schematic diagrams of a control architecture of the dual fuel engine system of FIG. 1, according to at least one embodiment.
Figure 8:
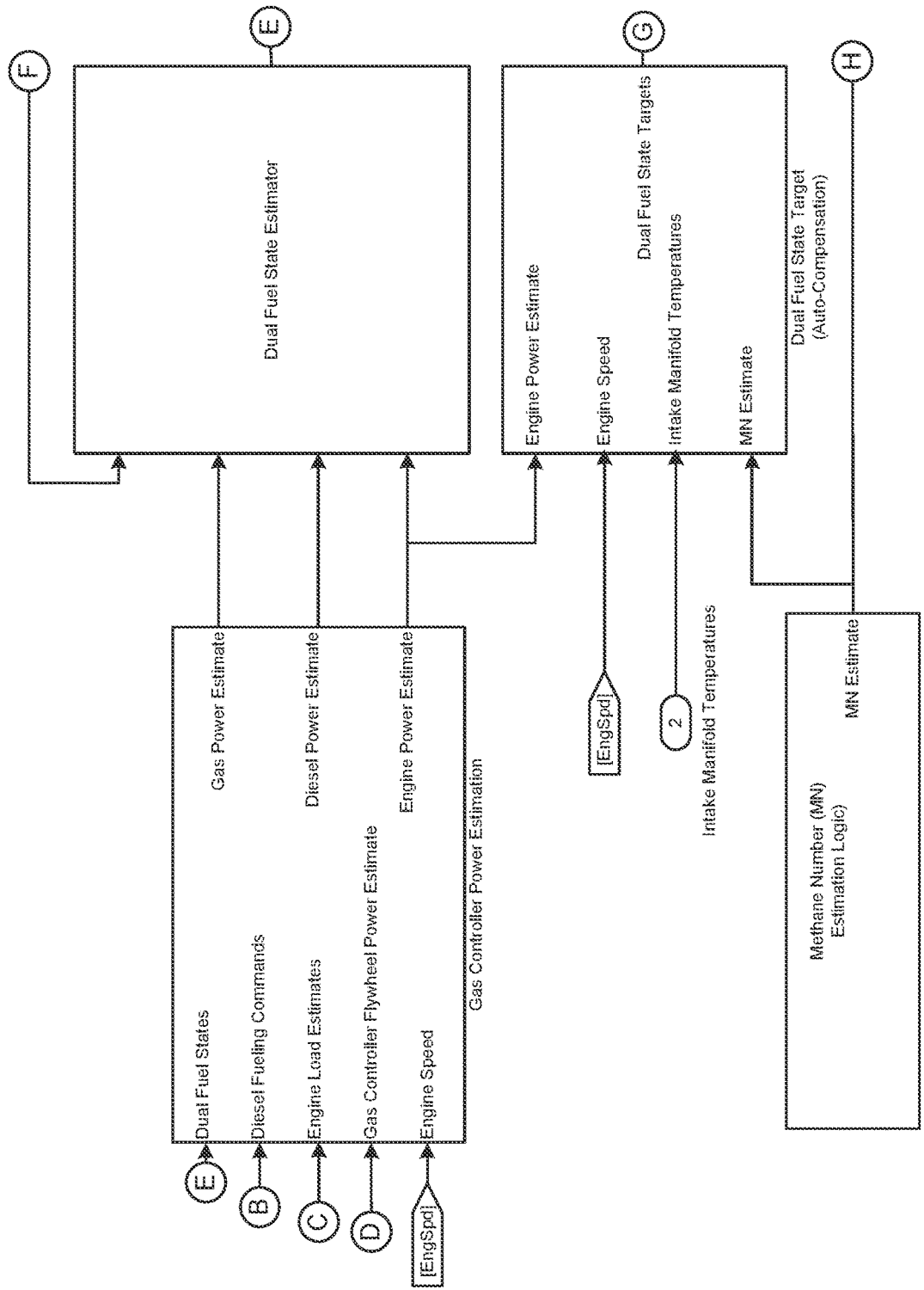
Figure 9:
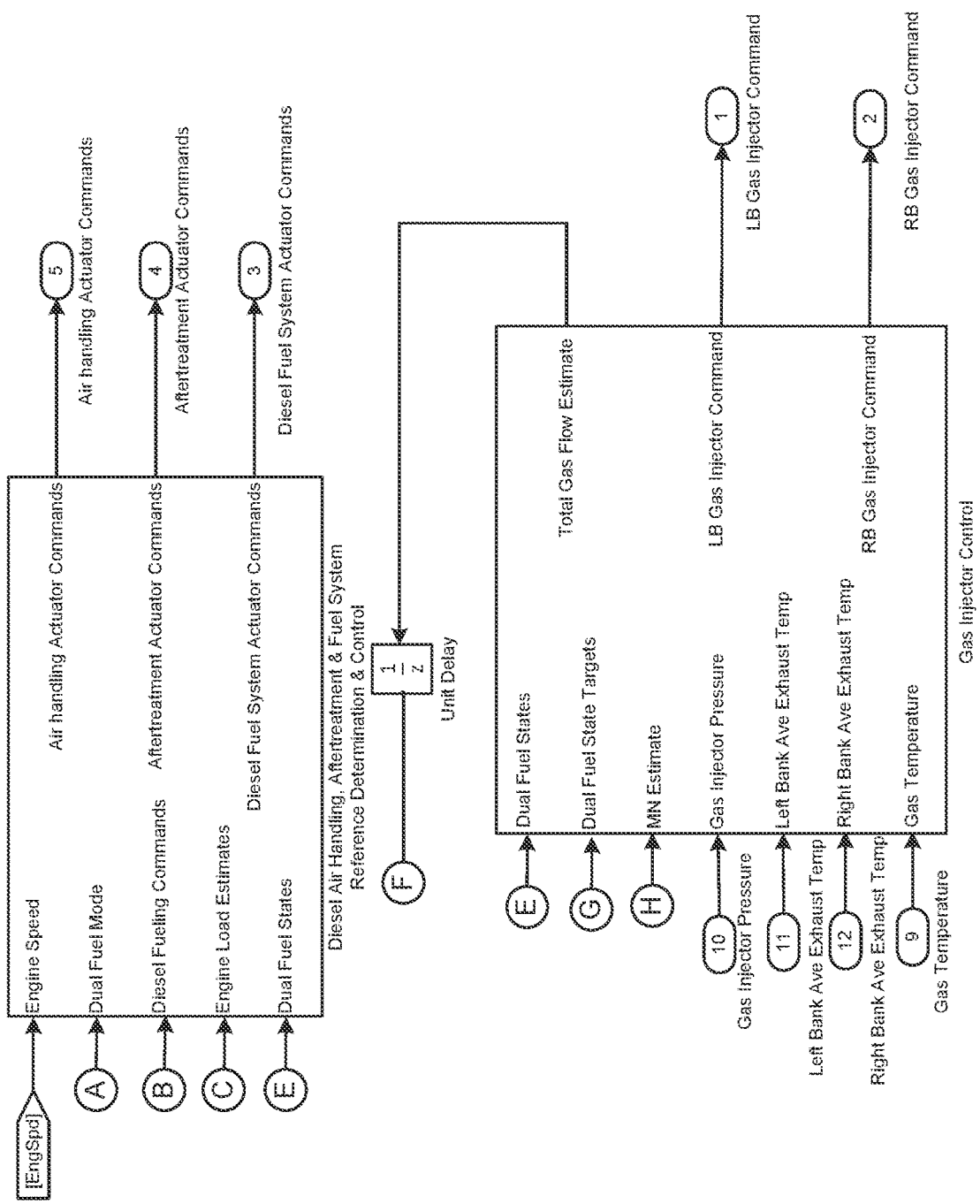

As shown in FIGS. 7-9, the control architecture shown in FIG. 5 and the communication scheme shown in FIG. 6 can be used to implement the substitution rate and control the dual fuel engine system 10. FIGS. 7-9 show an exemplary control architecture that results in one or more commands being sent to the gas injectors, the diesel injectors, the air handling system, and the aftertreatment system of the engine system 10 to facilitate the operations discussed herein. The controls shown are exemplary and non-limiting. Some embodiments include less, more, or different controllers, communications, and control steps.

In particular, FIG. 7 shows a gas controller dual fuel mode command generated based on a diesel engine control module, a dual fuel mode activation request, and inputs from gas control system sensors. In some embodiments, the gas controller dual fuel command is sent in the form of a dual fuel mode signal to a dual fuel mode calculator (e.g., processor 102 of dual fuel engine system 10). Together with the gas controller dual fuel command, the calculator is configured to receive engine friction parameters, engine speed information, parasitic torque parameters, and a power estimate. The dual fuel mode calculator also receives as input a gas controller flywheel power estimate based on one or more of the power estimate, a flywheel torque measurement, a pump speed, a pump discharge pressure, and an engine speed. The processor 102 and is configured to output diesel fueling commands and engine load estimates. As seen in FIG. 8, the processor 102 of the dual fuel engine system 10 is configured to estimate and output one or more of a gas controller power estimate, a diesel power estimate and an engine power estimate. The processor 102 of the dual fuel engine system 10 is configured to estimate the one or more of the gas controller power estimate, the diesel power estimate and the engine power estimate based on one or more of the diesel fueling commands, engine load estimates, gas controller flywheel power estimate, and engine speed. The engine power estimate is usable in connection with the engine speed, intake manifold temperature information, and a methane number estimate to determine a dual fuel target for automatic compensation of the state of the dual fuel engine system 10. The methane number is calculable in accordance with any suitable technique. As reflected in FIG. 9, dual fuel mode information, diesel fueling commands, engine load estimates and dual fuel state information are usable to generate one or more commands. For example, the commands include but are not limited to air handling actuator commands, aftertreatment actuator commands, and diesel fuel system actuator commands. Further, the dual fuel state information and target information are usable with the methane estimate, a gas injector pressure, a left bank average exhaust temperature, a right bank average exhaust temperature, and a gas temperature to determine a total gas flow estimate and injector commands for the left and right bank injectors. The total gas flow estimate information is transmittable to the processor 102 for dual fuel state estimation, e.g., with a delay factor applied.

The aftertreatment system 30 and the controller 94 discussed above may be implemented with the controls shown and described with respect to FIGS. 5-9 or with other engine system controls. The controller 94 may be integrated with a controller shown in FIGS. 5-9 or may be implemented as a distributed control entity residing in more than one controller shown in FIGS. 5-9.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 2, it should be understood that the controller 94 may include any number of circuits for completing the functions described herein. For example, the activities and functionalities of the circuits may be combined in multiple circuits or as a single circuit. Additional circuits with additional functionality may also be included. Further, the controller 94 may further control other activity not described herein. In some embodiments, the controller 94 is a part of an engine control module or unit.

As mentioned above and in one configuration, the "circuits" may be implemented in machine-readable medium for execution by various types of processors, such as the processor 102 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or multiple instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is used above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the control unit 94, for example the one or more processors may be a remote processor (e.g., a cloud based processor). Alternatively or additionally, the one or more processors may be internal and/or local to the control unit 94. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the dual fuel engine and aftertreatment system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. An aftertreatment system, comprising:
   a selective catalytic reduction system structured to receive exhaust gases from a dual fuel engine system and including a diesel exhaust fluid dosing unit;
   an ammonia slip catalyst positioned directly downstream of the selective catalytic reduction catalyst;
   an oxidation catalyst positioned directly downstream of the ammonia slip catalyst; and
   one or more processing circuits comprising one or more memory devices coupled to one or more processors, the one or more memory devices configured to store instructions thereon that, when executed by the one or more processors, cause the one or more processors to:
      receive a system out NOx value, a space velocity, an ammonia to NOx ratio, an exhaust temperature, a substitution rate, and a conversion efficiency target,
      determine a conversion efficiency differential,
      adjust the substitution rate based on the system out NOx value,
      adjust the ammonia to NOx ratio based on the space velocity, the ammonia to NOx ratio, the exhaust temperature, the substitution rate, the conversion efficiency target, and the conversion efficiency differential, and
      determine a diesel exhaust fluid dosing rate for the diesel exhaust fluid dosing unit.

2. The aftertreatment system of claim 1, wherein the selective catalytic reduction catalyst includes a vanadium substrate.

3. The aftertreatment system of claim 1, wherein the selective catalytic reduction catalyst and the ammonia slip catalyst are co-located in a single housing.

4. The aftertreatment system of claim 1, wherein the one or more memory devices are further configured to store instructions thereon that, when executed by the one or more processors, cause the one or more processors to receive the substitution rate, the space velocity, the ammonia to NOx ratio, the exhaust temperature, and the conversion efficiency target from three-dimensional tables stored in the one or more memory devices.

5. The aftertreatment system of claim 4, wherein the one or more memory devices are configured to store the three-dimensional tables including the space velocity, the ammonia to NOx ratio, the exhaust temperature, and the conversion efficiency target are associated with the substitution rate.

6. The aftertreatment system of claim 1, wherein the one or more memory devices are further configured to store instructions thereon that, when executed by the one or more processors, cause the one or more processors to determine a target ammonia to NOx ratio after adjusting the ammonia to NOx ratio.

7. The aftertreatment system of claim 1, wherein the one or more memory devices are further configured to store instructions thereon that, when executed by the one or more processors, cause the one or more processors to receive the space velocity, the exhaust temperature, the substitution rate, and the conversion efficiency target from a dual fuel engine system.

8. A dual fuel system, comprising:
   a dual fuel engine system including
      a first fuel source,
      a second fuel source, and a cylinder structured to combust a first fuel from the first fuel source and a second fuel from the second fuel source simultaneously;
an aftertreatment system including
a selective catalytic reduction system structured to receive exhaust gases from the cylinder and including a diesel exhaust fluid dosing unit structured to provide diesel exhaust fluid into the received exhaust gases,
an ammonia slip catalyst positioned downstream of the selective catalytic reduction system, and
an oxidation catalyst positioned downstream of the ammonia slip catalyst; and
one or more processing circuits comprising one or more memory devices coupled to one or more processors, the one or more memory devices configured to store instructions thereon that, when executed by the one or more processors, cause the one or more processors to:
receive a system out NOx value, a space velocity, an ammonia to NOx ratio, an exhaust temperature, a substitution rate, and a conversion efficiency target,
determine a conversion efficiency differential,
adjust the substitution rate based on the system out NOx value,
adjust the ammonia to NOx ratio based on the space velocity, the ammonia to NOx ratio, the exhaust temperature, the substitution rate, the conversion efficiency target, and the conversion efficiency differential, and
determine a diesel exhaust fluid dosing rate for the diesel exhaust fluid dosing unit.

9. The dual fuel system of claim 8, wherein the first fuel is natural gas introduced into an intake air stream, and the second fuel is diesel fuel.

10. The dual fuel system of claim 8, wherein the selective catalytic reduction catalyst and the ammonia slip catalyst are co-located in a single housing.

11. The dual fuel system of claim 8, wherein the substitution rate, the space velocity, the ammonia to NOx ratio, the exhaust temperature, and the conversion efficiency target are received from three-dimensional tables stored in the one or more memory devices.

12. The dual fuel system of claim 11, wherein the three-dimensional tables stored in the one or more memory devices include information relating to the space velocity, the ammonia to NOx ratio, the exhaust temperature, and the conversion efficiency target.

13. The dual fuel system of claim 8, wherein a target ammonia to NOx ratio is determined after adjusting the ammonia to NOx ratio.

14. The dual fuel system of claim 8, wherein the space velocity, the exhaust temperature, the substitution rate, the conversion efficiency target are received from the dual fuel engine system.

15. A dual fuel apparatus, comprising:
one or more processing circuits comprising one or more memory devices coupled to one or more processors, the one or more memory devices configured to store instructions thereon that, when executed by the one or more processors, cause the one or more processors to:
actuate a first fuel actuator to introduce a first gaseous fuel into an intake air stream;
actuate a second fuel actuator to introduce a second liquid fuel into a cylinder; and
actuate a diesel exhaust fluid dosing unit to treat exhaust gases received from a dual fuel engine combusting the first fuel and the second fuel with a selective catalytic reduction system based on a space velocity, an ammonia to NOx ratio, an exhaust temperature, a substitution rate, and a conversion efficiency target.

16. The dual fuel apparatus of claim 15, wherein the one or more memory devices are further configured to store instructions thereon that, when executed by the one or more processors, cause the one or more processors to actuate the diesel exhaust fluid dosing unit including adjusting the ammonia to NOx ratio based on a conversion efficiency differential.

17. The dual fuel apparatus of claim 16, wherein the one or more memory devices are further configured to store instructions thereon that, when executed by the one or more processors, cause the one or more processors to adjust the substitution rate.

18. The dual fuel apparatus of claim 15, wherein the one or more memory devices are further configured to store instructions thereon that, when executed by the one or more processors, cause the one or more processors to actuate the diesel exhaust fluid dosing unit including querying three-dimensional tables saved in the one or more memory devices, the three-dimensional tables including the space velocity, the ammonia to NOx ratio, the exhaust temperature, and the conversion efficiency target.

19. The dual fuel apparatus of claim 18, wherein the one or more memory devices are further configured to store instructions thereon that, when executed by the one or more processors, cause the one or more processors to query the three-dimensional tables using the substitution rate.

20. The dual fuel apparatus of claim 18, wherein the one or more memory devices are further configured to store instructions thereon that, when executed by the one or more processors, cause the one or more processors to actuate the diesel exhaust fluid dosing unit including feedback based control.

* * * * *